United States Patent [19]

Haatveit

[11] Patent Number: 5,335,704
[45] Date of Patent: Aug. 9, 1994

[54] PASTEURIZED TO RAW LIQUID PROCESSING SYSTEM

[75] Inventor: John R. Haatveit, Martinez, Calif.

[73] Assignee: Safeway Stores, Inc., Oakland, Calif.

[21] Appl. No.: 895,797

[22] Filed: Jun. 9, 1992

[51] Int. Cl.$^5$ ............................................. G05D 9/00
[52] U.S. Cl. ........................................ 141/95; 141/198; 141/324; 141/285; 137/571; 99/453
[58] Field of Search ............... 141/2, 18, 21, 94, 95, 141/98, 192, 198, 83, 285, 309, 324; 99/452, 453; 137/571–573, 575; 220/745, 565, 567, 661; 426/231, 232, 399, 522, 580, 584

[56] References Cited

U.S. PATENT DOCUMENTS

| | | | |
|---|---|---|---|
| 1,192,294 | 7/1916 | Gantz | 220/565 X |
| 2,059,716 | 11/1936 | Swinburne | 137/571 X |
| 2,563,470 | 8/1951 | Kane | 220/567 X |
| 3,537,608 | 11/1970 | Fallows | 220/565 X |
| 3,582,351 | 6/1971 | Austin et al. | 426/584 X |
| 4,212,889 | 7/1980 | Fuentevilla | 137/575 X |
| 4,215,719 | 8/1980 | Laar et al. | 137/571 X |
| 4,910,035 | 3/1990 | Ellis | 426/584 |
| 4,926,747 | 5/1990 | Hashimoto et al. | 426/231 X |
| 5,033,637 | 7/1991 | Webb | 220/565 |

FOREIGN PATENT DOCUMENTS 1907906 12/1969 Fed. Rep. of Germany ...... 137/575

Primary Examiner—J. Casimer Jacyna
Attorney, Agent, or Firm—Flehr, Hohbach, Test, Albritton & Herbert

[57] ABSTRACT

A pasteurized to raw liquid processing system for milk or milk products includes top and bottom tanks, one elevated above the other approximately two feet. The tanks are vented to atmosphere. To prevent foaming, the inlet from a pasteurized source to the top tank is below the liquid level and the same is true of the inlet to the bottom tank which via a throttle valve receives liquid from the bottom of the top tank. Automatic feedback level controls are provided. Since both tanks are vented to atmosphere and because of the gravity flow between the top and bottom tanks, it is impossible to have a vacuum or pressure buildup which would cause a contaminating back flow.

4 Claims, 1 Drawing Sheet

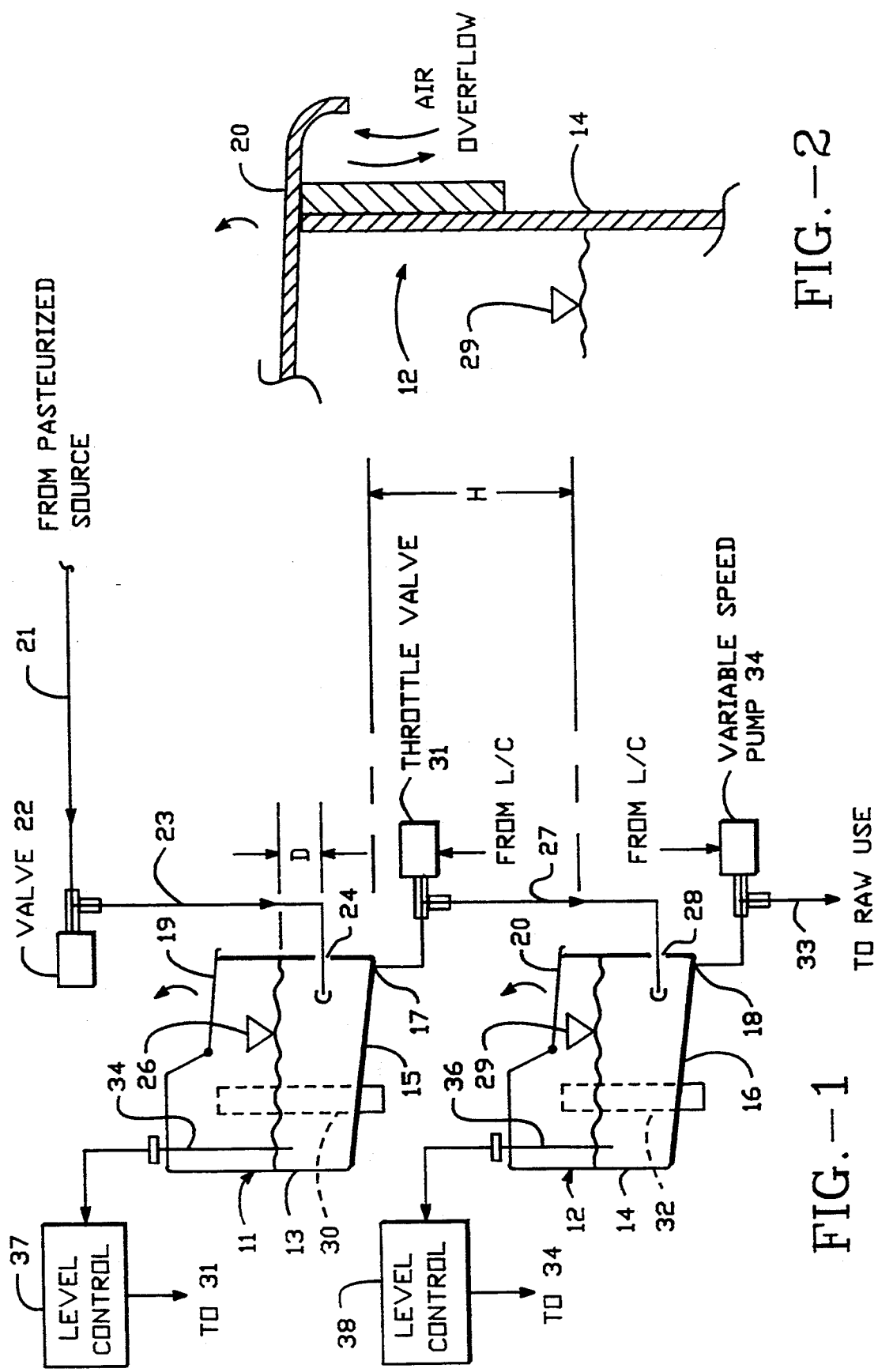

PASTEURIZED TO RAW LIQUID PROCESSING SYSTEM

The present invention is directed to a pasteurized to raw liquid processing system and more specifically, to a system for processing milk-product liquids where the milk is transferred from a pasteurized source to a raw use.

BACKGROUND OF THE INVENTION

In the processing of milk and milk type products, it is a United States Food and Drug Administration requirement that the processing system must provide adequate protection to prevent raw milk from contaminating pasteurized milk and milk products. A typical milk process might be, for example, raw milk from the farm is placed in a raw storage tank in the milk processing plant. Then it is pasteurized and stored in a pasteurized tank. Thereafter the output of the pasteurized tank can be to directly fill bottles and cartons and be sent to retail stores for sale. But when the contents of the pasteurized tanks are to be used for other purposes, such as being placed in a blending tank, for example, to make chocolate milk, or being transferred to a truck for transport, this is regarded as a transfer back to a raw stage. And when this occurs protection as specified by the FDA must be provided.

In the past and also with all present installations of other parties, a vertical air gap separation in the product flow is provided. In other words, there is a pipe inlet above the liquid level in a tank and the milk or milk product falls through an air gap to the liquid. The result is turbulence and air causes foam and/or air entrainment. And it is difficult to deal with the milk product in this state since the weighing of the milk, for example, if it is to be placed in cartons or is to be blended, is very difficult.

OBJECT AND SUMMARY OF THE INVENTION

Therefore it is an object of the present invention to provide an improved pasteurized to raw processing system.

In accordance with the above object a pasteurized to raw liquid processing system comprises a top and bottom pair of liquid tanks each having a bottom and a side. The top tank is placed at a higher elevation than the bottom tank. Means for venting both of the tanks to atmosphere are provided to prevent buildup of either pressure or vacuum. Feedback means are provided to maintain the liquid in each tank at a substantially predetermined level. Inlet means for the liquid at each side of the tank are provided which are located below the predetermined liquid level for preventing foam or air entrainment due to the incoming liquid. Finally pipe means connect the bottom of the top tank to the inlet means of the bottom tank to allow gravity flow of the liquid from the top to the bottom tank.

BRIEF DESCRIPTION OF THE DRAWINGS

FIG. 1 is a simplified schematic view of the overall processing system of the present invention showing the two tanks.

FIG. 2 is an enlarged detail view of a lid cover portion of the tanks of FIG. 1.

DETAILED DESCRIPTION OF PREFERRED EMBODIMENTS

FIG. 1 illustrates the overall processing system of the present invention which includes a top tank 11 and a bottom tank 12. Sides of each tank are generally cylindrical as indicated at 13 and 14 with sloping bottoms 15 and 16. Each of the bottoms terminate in an outlet 17 and 18. The top of each tank is enclosed but includes a freely movable cover 19 and 21 which is hinged at one end and in case of an overflow would be pushed up in the direction shown by the arrows.

Tank 11 contains a milk product from a pasteurized source, line 21, which is controlled by the valve 22 and is input by line 23 into the tank at an inlet 24. The liquid level of the tank is shown as 26 and the inlet is located below this predetermined liquid level 26 by the distance D. This would be optimally perhaps 9 inches with perhaps a minimum of 6 inches which is sufficient to prevent the foaming or bubbling as discussed above.

Similarly the bottom tank 12 receives liquid from the bottom outlet 17 of the top tank 11 through the pipe 27 and into an inlet 28 which again, as in the case of the top tank, is a level below the predetermined liquid level 29. In the pipe 27 there is a throttle valve 31 which regulates the gravity flow from the tank 11 to tank 12. Gravity flow occurs because of the location of the bottom 15 of tank 11, a distance indicated H above the overflow cover 20 of bottom tank 12. Referring briefly to FIG. 2 this overflow cover 20, if the liquid level accidentally rises above the level 29 to the top of the tank, allows the liquid to overflow in the direction indicated by the arrow; thus, positive pressures are prevented. On the other hand, it also vents the tank to air as indicated by the arrow labeled "air" in the opposite direction. Cover 19 of tank 11 is similarly constructed (in a manner not shown but well known in the art) to thus vent the tank to atmosphere to prevent buildup of either pressure or vacuum.

As an alternative to the hinged cover 19, 20 design, overflow pipes 30, 32 (shown in dashed outline) can be utilized if desired.

Referring now back to FIG. 1, the bottom outlet 18 of the bottom, tank 12 is coupled to a raw use pipeline 33 by a variable speed pump 34.

To maintain the predetermined liquid level in each tank, there are feedback means which include liquid level sensors 34 and 36 in the respective tanks. These are coupled to level control units 37 and 38 which then feedback the proper control signal respectively to throttle valve 31 and variable speed pump 34.

In operation when the valve 22 is opened milk product flows on pipe 21 through the valve and into the pipe 23 to the below liquid level inlet 24. And by the feedback control system including level control 37, the tank is filled to the liquid level 26 by control of the throttle valve 31. At the same time, the variable speed pump 34 is regulated to maintain the liquid at level 29 of the bottom tank 12.

The foregoing arrangement has been approved by the Food and Drug Administration and prevents the possibility of product contamination since no raw product (defined as the product in tank 12) can flow back into tank 11. This is because of the fact that both tanks are vented to atmosphere and thus there can be no unwanted vacuum or positive pressure. Thus, the distance H between the bottom 15 of tank 11 and the overflow portion of tank 12 serves as an effective air gap. If the variable speed pump 34 were to malfunction and pump in the reverse direction, the cover 20 would allow any raw product to overflow and the gravity distance H would prevent flow into the upper tank. And such gravity distance H would typically be two feet. The distance could, of course be increased but it is believed that 18 inches is a minimum for safety. Thus an improved pasteurized to raw processing system has been provided.

What is claimed is:

1. A pasteurized to raw liquid processing system comprising:

a top and bottom pair of liquid tanks each having a bottom, a side, and a cover to enclose such tank to prevent contamination of said liquid, said top tank being higher in elevation than said bottom tank;

means for continuously venting both of said tanks to atmosphere to prevent buildup of either pressure or vacuum;

inlet means for said liquid at said side of each tank located below said predetermined liquid level for preventing foam or air entrainment due to incoming liquid, said inlet means of said top tank being connected to a source of said pasteurized liquid;

pipe means connecting said bottom of said top tank to said inlet means of said bottom tank for allowing gravity flow of said liquid from said top to bottom tank;

a first independent feedback means attached to said top tank for maintaining the liquid in said top tank at a substantially predetermined level, where said first feedback means includes a means for controlling fluid flow in said pipe means for maintaining said liquid level in said top tank;

a second independent feedback means attached to said bottom tank for maintaining the liquid in said bottom tank at a substantially predetermined level, where said second feedback means includes a means for controlling fluid flow connected to a bottom outlet of said bottom tank for maintaining said liquid level in said bottom tank.

2. A processing system as in claim 1 where said means for controlling fluid flow in said first feedback means is a throttle valve.

3. A processing system as in claim 1 where said means for controlling fluid flow in said second feedback means is a variable speed pump.

4. A pasteurized to raw liquid processing system as in claim 1 where said bottom of said top tank is higher than said cover of said bottom tank.

* * * * *